(12) United States Patent
Koyama (10) Patent No.: US 8,335,470 B2
(45) Date of Patent: Dec. 18, 2012

(54) COMMUNICATION APPARATUS AND METHOD FOR CONTROLLING THE SAME

(75) Inventor: Tadashi Koyama, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 1121 days.

(21) Appl. No.: 12/201,965

(22) Filed: Aug. 29, 2008

(65) Prior Publication Data

US 2009/0098827 A1 Apr. 16, 2009

(30) Foreign Application Priority Data

Aug. 30, 2007 (JP) ................................. 2007-224013

(51) Int. Cl.
*H04B 7/00* (2006.01)
(52) U.S. Cl. .................. 455/41.2; 455/41.1; 455/556.1; 455/575.3; 455/90.2; 455/121; 455/575.1; 455/90.1; 455/574; 343/702; 343/745; 343/750; 235/492; 235/493; 340/572.1; 340/572.8; 340/539.1; 340/539.21
(58) Field of Classification Search .................. 455/41.2, 455/41.1, 556.1, 575.3, 90.2, 121, 107, 575.1, 455/90.1, 574; 343/702, 745, 750; 235/492, 235/493; 340/572.1, 572.8, 539.1, 539.21
See application file for complete search history.

(56) References Cited

U.S. PATENT DOCUMENTS

| | | | |
|---|---|---|---|
| 4,218,612 A * | 8/1980 | Krehl et al. ................... 235/449 |
| 6,321,067 B1 * | 11/2001 | Suga et al. ................... 455/41.2 |
| 6,958,730 B2 * | 10/2005 | Nagumo et al. .............. 343/702 |
| 7,142,811 B2 * | 11/2006 | Terranova et al. ........... 455/41.1 |
| 7,539,465 B2 * | 5/2009 | Quan ............................ 455/121 |
| 7,574,173 B2 * | 8/2009 | Terranova et al. ........... 455/41.1 |
| 7,762,469 B2 * | 7/2010 | Sueoka et al. ................ 235/492 |
| 2003/0003870 A1 * | 1/2003 | Cernusca et al. .............. 455/41 |
| 2004/0113842 A1 * | 6/2004 | du Toit et al. .......... 343/700 MS |
| 2004/0135729 A1 * | 7/2004 | Talvitie et al. ................ 343/702 |
| 2005/0128155 A1 * | 6/2005 | Fukuda ......................... 343/745 |
| 2006/0160488 A1 | 7/2006 | Sueoka et al. |
| 2006/0172702 A1 * | 8/2006 | Wuidart et al. ............. 455/41.2 |

FOREIGN PATENT DOCUMENTS

| | | |
|---|---|---|
| JP | 2003-018051 A | 1/2003 |
| JP | 2003-166826 A | 6/2003 |
| JP | 2003-188765 | 7/2003 |
| JP | 2003-198670 A | 7/2003 |
| JP | 2005-073113 A | 3/2005 |
| JP | 2005-229474 | 8/2005 |

(Continued)

OTHER PUBLICATIONS

Notification of Reasons for Refusal dated Aug. 18, 2011 issued for counterpart Japanese Application No. 2008-195395.

*Primary Examiner* — April G Gonzales
(74) *Attorney, Agent, or Firm* — Procopio, Cory, Hargreaves & Savitch LLP (57) ABSTRACT

A communication apparatus and a method used by the communication apparatus to perform magnetic-field communication with an external apparatus is provided. The communication apparatus determines the communication distance between the communication apparatus and the external apparatus based on the voltage level of a radio signal, a distance measuring device, or other means. The communication distance is compared to a predetermined distance and the communication apparatus dynamically adjusts its resonance frequency for improved magnetic-field communication with the external apparatus.

12 Claims, 7 Drawing Sheets

FOREIGN PATENT DOCUMENTS

| | | |
|---|---|---|
| JP | 2005-237166 A | 9/2005 |
| JP | 2006-072901 A | 3/2006 |
| JP | 2006-197510 A | 7/2006 |
| JP | 2006-238398 A | 9/2006 |
| JP | 2006-279813 A | 10/2006 |
| JP | 2007-067494 A | 3/2007 |

* cited by examiner

COMMUNICATION APPARATUS AND METHOD FOR CONTROLLING THE SAME

CROSS-REFERENCE TO RELATED APPLICATION

The present application claims priority under 35 U.S.C. §119 to Japanese Patent Application No. 2007-224013, filed Aug. 30, 2007, entitled "COMMUNICATION APPARATUS AND METHOD FOR CONTROLLING THE SAME," the entirety of which is incorporated herein by reference.

BACKGROUND OF THE INVENTION

1. Field of the Invention

The present invention relates to a communication apparatus that communicates with an external apparatus and a method for controlling the communication apparatus.

2. Description of the Related Art

There has been known a communication apparatus including a communication unit to perform magnetic-field communication with an external apparatus by using the principle of electromagnetic induction. This communication unit includes an Radio Frequency Identification (RFID) chip or the like, which is a noncontact Integrated Circuit (IC) chip.

The conventional communication unit includes a magnetic-field antenna or the like, and a resonance (tuning) frequency to perform magnetic-field communication with an external apparatus, where the frequency to resonate with the external apparatus is predetermined to be within a certain range. Thus, adjustment of the resonance frequency has been required. For example, it has been known to apply a conductive material onto a magnetic-field antenna for RFID in a step of assembling a communication apparatus so as to change the inductance value of the magnetic-field antenna and to adjust the resonance frequency.

Also, it has been known to provide a function of adjusting a resonance frequency using a trimmer capacitor or the like on a circuit board, form a hole or the like in a casing so that the trimmer capacitor can be adjusted from the outside of a communication unit, and adjust the resonance frequency in a resonance frequency adjusting step before factory shipment. Because the resonance frequency for magnetic-field communication with an external apparatus varies in respective communication units, the above-described resonance frequency adjusting step is required to be performed on the respective communication units, which is wasteful.

Accordingly, a communication apparatus capable of preferably adjusting the resonance frequency of a communication unit without the necessity of such wasteful adjustment and a method for controlling the communication apparatus have been demanded.

SUMMARY OF THE INVENTION

Described herein is a communication apparatus and a method used by the communication apparatus to perform magnetic-field communication with an external apparatus. The communication apparatus is configured to determine the communication distance between the communication apparatus and the external apparatus. The communication distance is compared to a predetermined distance and the communication apparatus dynamically adjusts its resonance frequency for improved magnetic-field communication with the external apparatus.

Other features and advantages of the present invention will become more readily apparent to those of ordinary skill in the art after reviewing the following detailed description and accompanying drawings.

DESCRIPTION OF THE PREFERRED EMBODIMENTS

Figure 1:
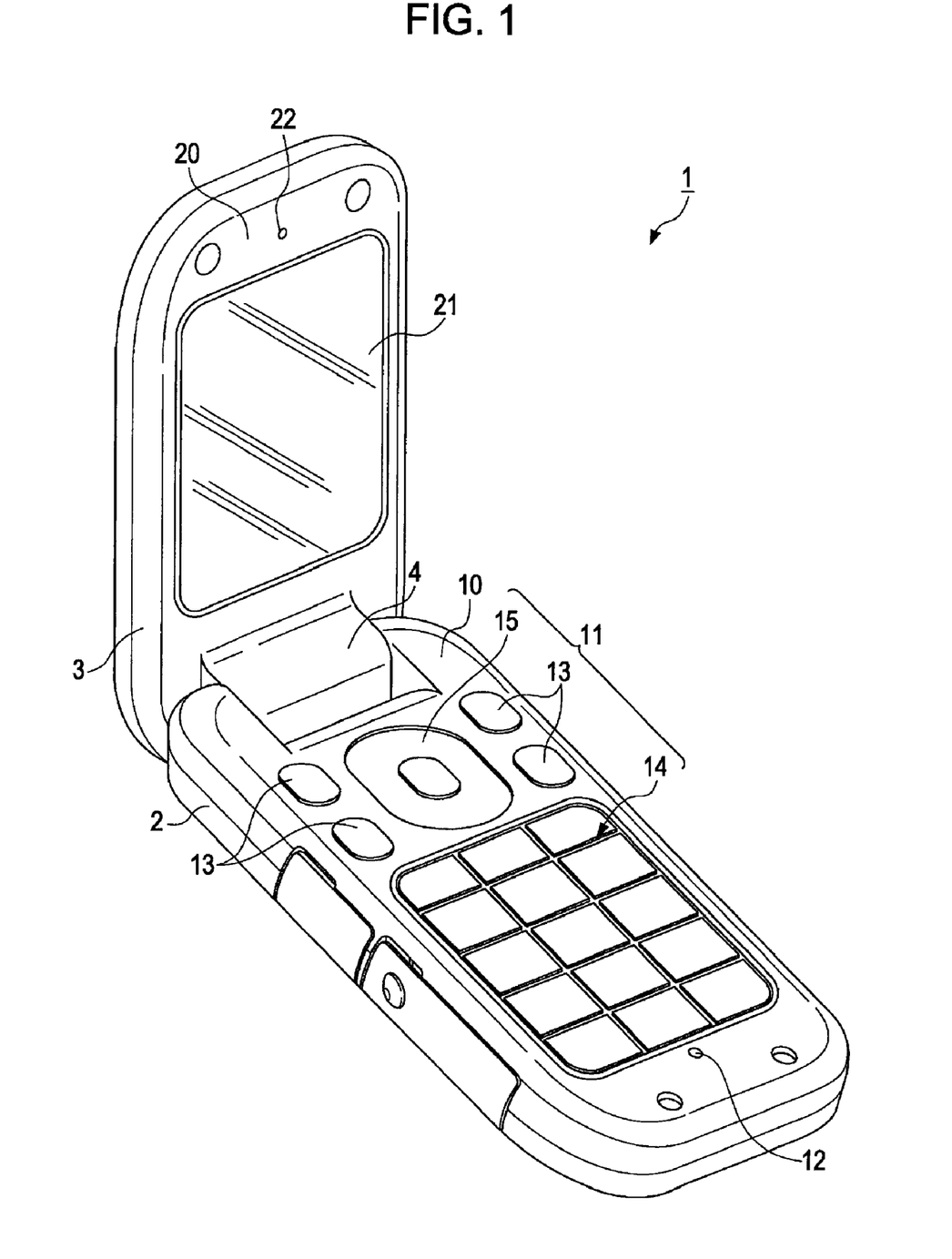
FIG. 1 is a perspective view of the appearance of a mobile phone apparatus as an example of a communication apparatus according to an embodiment of the present invention.

A mobile phone apparatus 1 illustrated in FIG. 1 used as an example of a communication apparatus according to an embodiment of the present invention is a so-called folding mobile phone apparatus. However, the form of the mobile phone apparatus is not limited to this form, and any form of mobile phone apparatus may also be used, including a sliding mobile phone apparatus in which one of two casings superimposed on each other can be slid in one direction; a turning mobile phone apparatus in which one of two casings superimposed on each other can be turned around an axis line along a superimposing direction; and a straight-type mobile phone apparatus including an operation unit and a display unit placed on a single casing and having no connecting portion, just to name a few.

The mobile phone apparatus 1 includes an operation-side casing 2 and a display-side casing 3. The operation-side casing 2 includes, on its surface 10, an operation button group 11 and a voice input unit 12 to which voice of a user of the mobile phone apparatus 1 is input during phone call. The operation button group 11 includes function setting operation buttons 13 to make various settings and operate various functions, such as an address function and an e-mail function; input operation buttons 14 to input a telephone number or characters for an e-mail; and a set operation button 15 to set various operations or perform scrolling.

The display-side casing 3 includes, on its surface 20, a display 21 to display various pieces of information and a voice output unit 22 to output voice of the other end of phone call.

The above-described operation button group 11, the voice input unit 12, the display 21, and the voice output unit 22 constitute part of an information processing unit 62 described below.

An upper-end portion of the operation-side casing 2 connects to a lower-end portion of the display-side casing 3 via a hinge mechanism 4. In the mobile phone apparatus 1, switching between an open state where the operation-side casing 2 and the display-side casing 3 are opened from each other and a folded state where the operation-side casing 2 and the display-side casing 3 are folded on each other can be performed by mutually turning the operation-side casing 2 and the display-side casing 3 connected to each other via the hinge mechanism 4.

Figure 2:
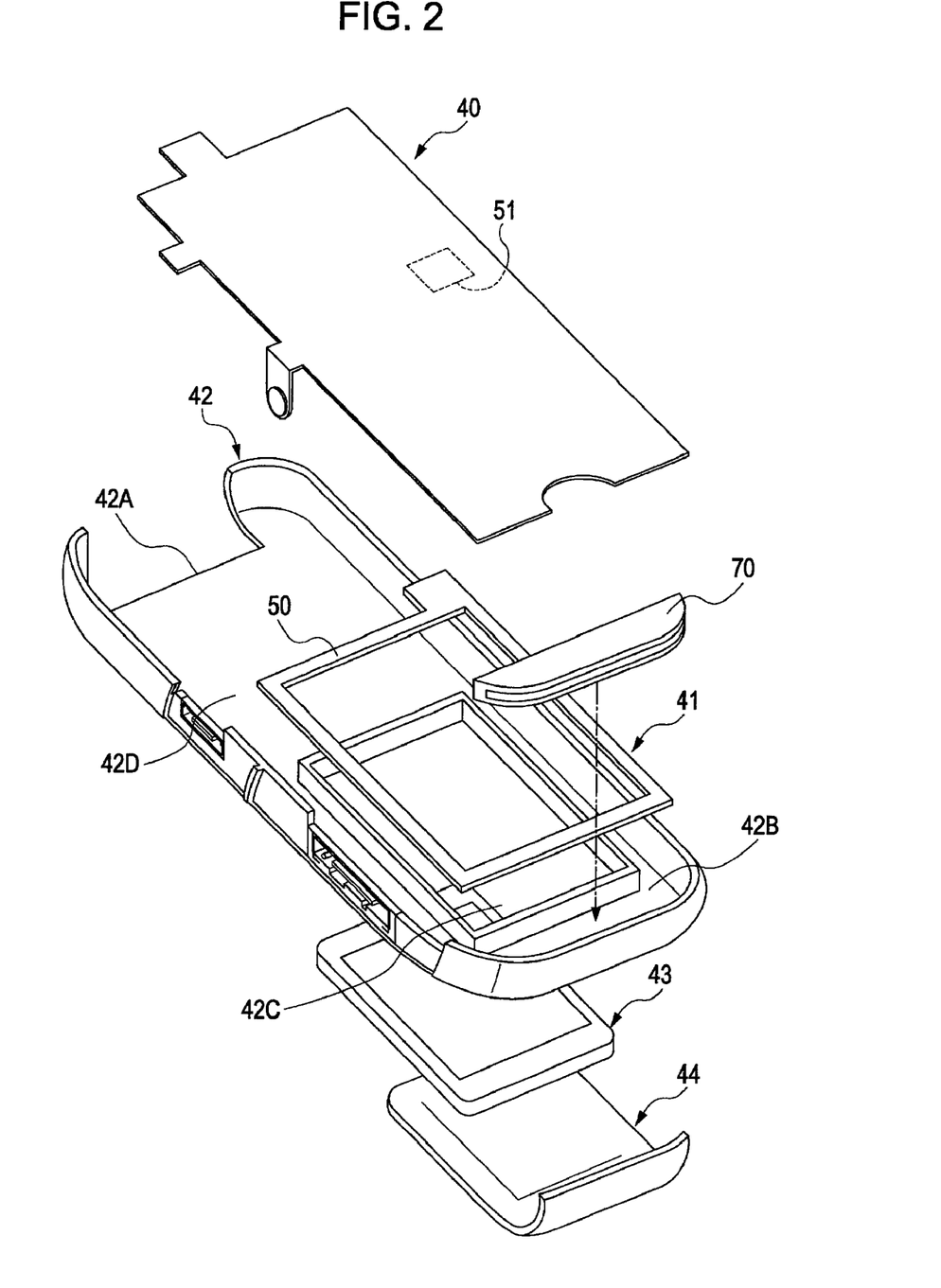
FIG. 2 is an exploded perspective view of part of an operation-side casing included in the mobile phone apparatus according to the embodiment.

As illustrated in FIG. 2, the operation-side casing 2 includes a substrate 40; a signal processing unit 41; a rear casing unit 42; a rechargeable battery 43; and a battery cover 44.

On the substrate 40, devices such as a CPU to perform predetermined processing are mounted. When the user operates the operation button group 11 on the surface 10, a predetermined signal is supplied to the CPU.

The signal processing unit 41 includes a magnetic-field antenna 50 to perform magnetic-field communication with an external apparatus in a first usable frequency band; an RFID chip 51 which is an IC chip to perform a predetermined process on information transmitted/received by the magnetic-field antenna 50 through magnetic-field communication; and a reactance variable unit 52 described below. The RFID chip 51 is placed on the substrate 40 facing the signal processing unit 41, as illustrated in FIG. 2. The details of the signal processing unit 41 are described below.

The rear casing unit 42 includes a hinge mechanism fixing unit 42A to the hinge mechanism 4; a main antenna accommodating unit 42B to accommodate a main antenna 70 that performs communication in a second usable frequency band, which is higher than the first usable frequency band; a battery accommodating unit 42C to accommodate the rechargeable battery 43; and an RFID fixing unit 42D to fix the signal processing unit 41. The details of the main antenna 70 are described below.

Figure 3:
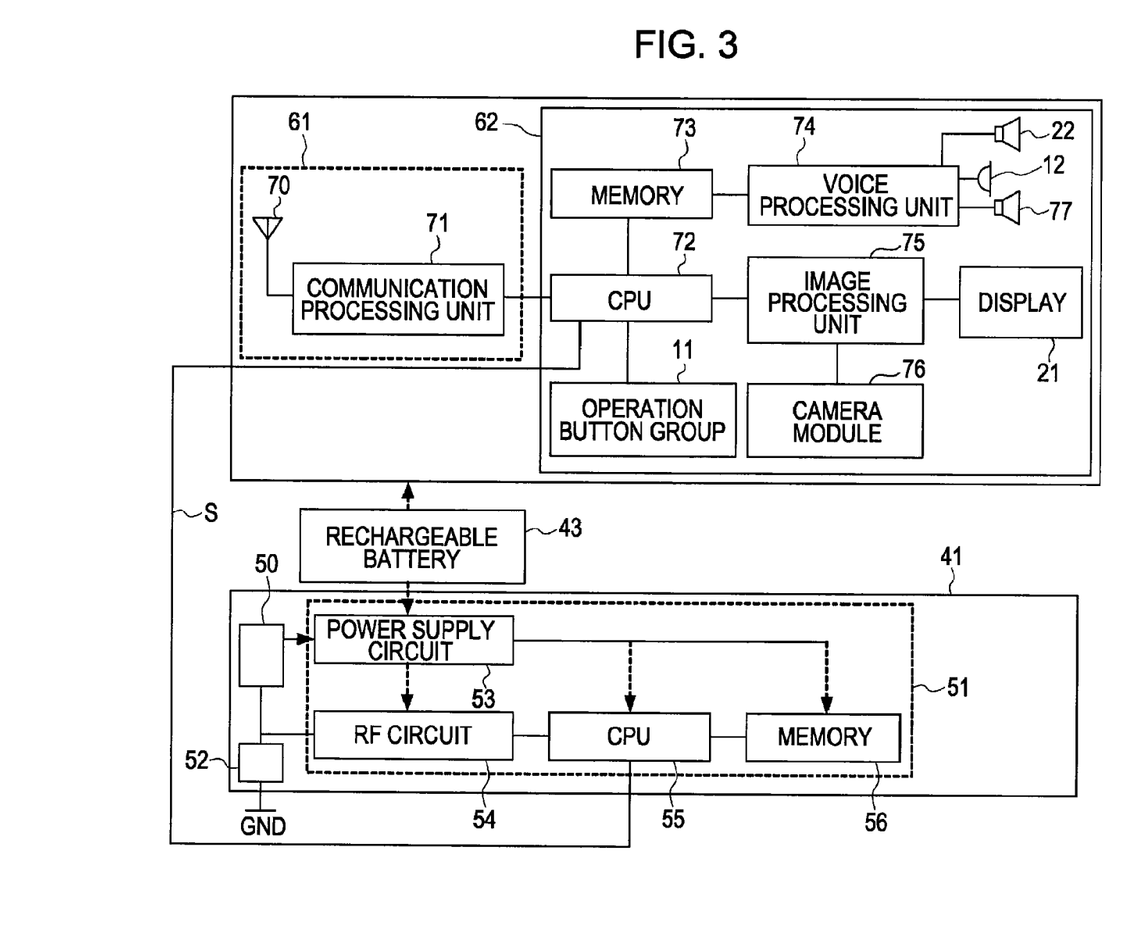
FIG. 3 is a block diagram of a function of the mobile phone apparatus according to the embodiment.

As illustrated in FIG. 3, the mobile phone apparatus 1 includes the signal processing unit 41 (communication unit) serving as a first communication unit; a second communication unit 61; and the information processing unit 62 to process information transmitted/received by the second communication unit 61.

As described above, the signal processing unit 41 includes the magnetic-field antenna 50 to perform magnetic-field communication with an external apparatus in the first usable frequency band (e.g., 13.56 MHz); the RFID chip 51; and the reactance variable unit 52 (frequency changing unit).

The magnetic-field antenna 50 includes a coil having a plurality of turns placed on a sheet made of a PET (polyethylene terephthalate) material and transmits/receives signals of the first usable frequency band to/from an external apparatus.

The RFID chip 51 includes a power supply circuit 53 to generate a predetermined power supply voltage; an RF circuit 54 to perform signal processing, such as modulation or demodulation, on signals transmitted/received by the magnetic-field antenna 50; a CPU 55 to perform predetermined processing; and a memory 56 to store predetermined data. The power supply circuit 53 includes an AC-DC converter, for example.

Now, an operation of the signal processing unit 41 is described.

When the magnetic-field antenna 50 approaches a reader/writer placed outside (external apparatus) with the distance therebetween being a predetermined distance, the magnetic-field antenna 50 receives electromagnetic waves transmitted from the external apparatus. The electromagnetic waves are transmitted after being modulated by a carrier frequency as the first usable frequency band (e.g., 13.56 MHz). The reactance variable unit 52 performs predetermined adjustment (tuning) so that the electromagnetic waves of the first usable frequency are supplied to the RF circuit 54 via the magnetic-field antenna 50.

The power supply circuit 53 generates a predetermined power supply voltage based on the power supply voltage supplied from the rechargeable battery 43. The power supply voltage is supplied to the RF circuit 54, the CPU 55, and the memory 56. The RF circuit 54, the CPU 55, and the memory 56 shift from a stopped state to an activated state by being supplied with the predetermined power supply voltage from the power supply circuit 53.

The RF circuit 54 performs signal processing, such as demodulation, on a signal of the first usable frequency band supplied via the magnetic-field antenna 50, and supplies the processed signal to the CPU 55.

The CPU 55 writes data on the memory 56 or reads data from the memory 56 based on the signal supplied from the RF circuit 54. After reading data from the memory 56, the CPU 55 supplies the data to the RF circuit 54. The RF circuit 54 performs signal processing, such as modulation, on the data read from the memory 56, and transmits the signal generated through the modulation to an external apparatus via the magnetic-field antenna 50.

According to the above description, the signal processing unit 41 is an active unit that is driven based on the power supply voltage supplied from the rechargeable battery 43, but the present invention is not limited to this. For example, a so-called passive induction electromagnetic field method (electromagnetic induction method) to generate an electromotive force by using electromagnetic induction, a passive mutual induction method (electromagnetic coupling method), or a radiation electromagnetic field method (radio wave method) may be used, among other methods.

According to the above description, the access method of the signal processing unit 41 is a read/write method, but the present invention is not limited to this. For example, a read-only method or a write-once method may also be used, among other methods.

The second communication unit 61 includes the main antenna 70 that communicates with an external apparatus in the second usable frequency band higher than the first usable frequency band; and a communication processing unit 71 to perform signal processing, such as modulation or demodulation. The second communication unit 61 is supplied with power from the rechargeable battery 43.

The main antenna 70 communicates with an external apparatus in the second usable frequency band (e.g., 800 MHz). In this embodiment, the second usable frequency band is set to 800 MHz, but another frequency band may be used. The main antenna 70 may be a so-called dual-band-compatible antenna that is compatible with a third usable frequency band (e.g., 2 GHz) in addition to the second usable frequency band. Furthermore, the main antenna 70 may be a multiband-compatible antenna that is compatible with a fourth usable frequency band in addition to the second and third usable frequency bands.

The communication processing unit 71 demodulates a signal received by the main antenna 70, supplies the processed signal to the information processing unit 62, modulates a signal supplied from the information processing unit 62, and transmits the signal to an external apparatus via the main antenna 70.

The information processing unit 62 includes the operation button group 11; the voice input unit 12; the display 21; the voice output unit 22; a CPU 72 (part of a communication status monitoring unit) to perform predetermined processing; a memory 73 to store predetermined data; a voice processing unit 74 to perform predetermined voice processing; an image processing unit 75 to perform predetermined image processing; a camera module 76 to capture an image of a subject; and a speaker 77 to output a ring tone and so on. The information processing unit 62 is supplied with power from the rechargeable battery 43. The CPU 55 and the CPU 72 connect to each other via a signal line S, so that information processed by the signal processing unit 41 is supplied to the image processing unit 75 via the signal line S and that information processed by the image processing unit 75 is displayed on the display 21.

Next, a resonance frequency f0 (predetermined resonance frequency) of the signal processing unit 41 is described. The resonance frequency is determined mainly based on an inductance value of the magnetic-field antenna, a capacitor for resonance, and terminal capacitance of the RFID IC chip.

Figure 4:
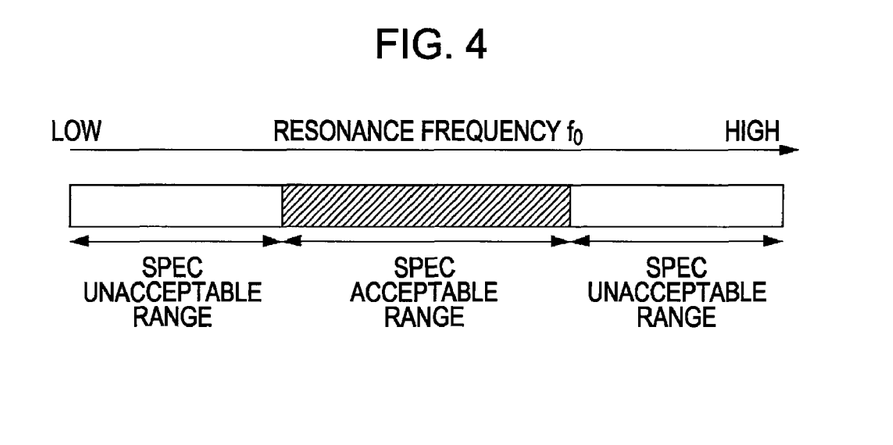
FIG. 4 illustrates a spec range of resonance frequencies in a magnetic-field antenna according to the embodiment.
Figure 5:
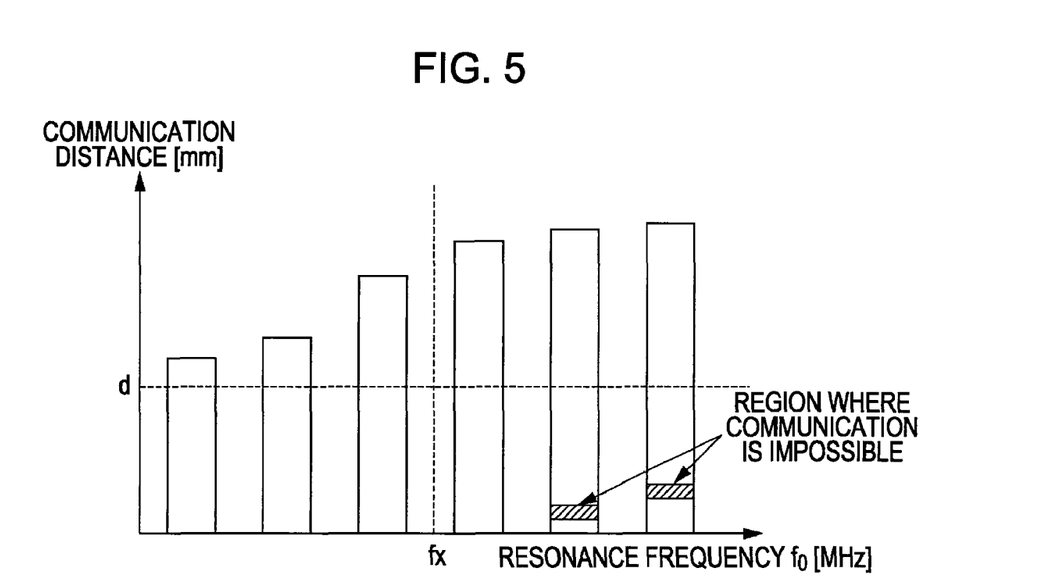
FIG. 5 illustrates the relationship of communication distances and regions where communication is impossible with respect to resonance frequencies in the magnetic-field antenna according to the embodiment.

The mobile phone apparatus is specified to use frequencies in a predetermined range (spec acceptable range) in order to appropriately communicate with an external apparatus. The resonance frequency f0 of the magnetic-field antenna 50 included in the signal processing unit 41 needs to be adjusted to be within the range, as illustrated in FIG. 4. If the resonance frequency f0 is lower than the certain range, a maximum communication distance between the magnetic-field antenna 50 and an external apparatus is short, which is not suitable for practical use. On the other hand, if the resonance frequency f0 is higher than the certain range, the maximum communication distance is long as illustrated in FIG. 5. In this case, however, a region where communication is impossible (region where communication with an external apparatus is impossible) exists, which is not suitable for practical use.

In this embodiment, a communication status between an external apparatus and the magnetic-field antenna 50 is monitored by the CPU 72, reactance is changed by the reactance variable unit 52 in accordance with the communication status, and the resonance frequency f0 is changed to enable favorable communication with the external apparatus, by using the above-described characteristic of the resonance frequency f0. For example, during communication, the communication distance between the external apparatus and the magnetic-field antenna 50 is dynamically measured, the reactance is changed by the reactance variable unit 52 in accordance with the communication status including the measured communication distance and a communication voltage is generated by magnetic-filed communication with the external apparatus, and the resonance frequency f0 is adjusted to a value enabling favorable communication.

Example 1

Figure 6:
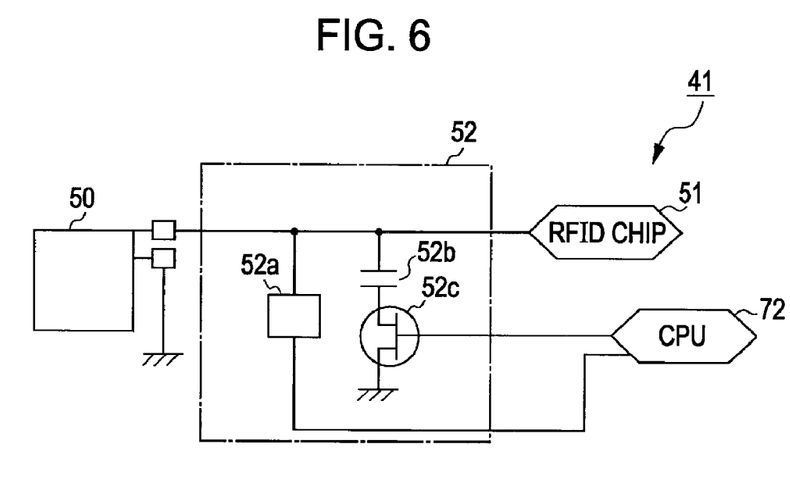
FIG. 6 is a circuit diagram of part of a signal processing unit according to example 1.

Referring to FIG. 6, the reactance variable unit 52 includes a voltage detecting circuit 52a; an adjusting capacitor 52b; and a FET switch 52c connected to the adjusting capacitor 52b in series. The voltage detecting circuit 52a is connected between the magnetic-field antenna 50 and the CPU 72. The FET switch 52c and the adjusting capacitor 52b connect to the magnetic-field antenna 50 in parallel.

At factory shipment, the resonance frequency f0 is set to a value higher than a predetermined frequency (frequency fx illustrated in FIG. 5). This is because, as is clear from FIG. 5, the communication distance can be made longer by setting the resonance frequency f0 to a value higher than the predetermined frequency compared to the case where the resonance frequency f0 is set to a lower value.

Figure 7:
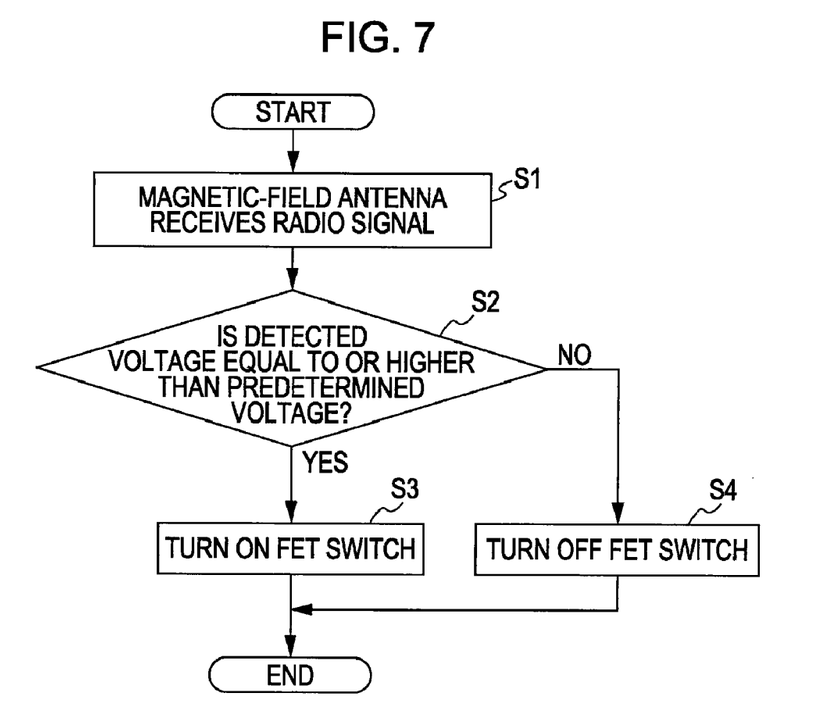
FIG. 7 is a flowchart of an operation performed when the signal processing unit according to example 1 receives a radio signal.

An operation of the reactance variable unit 52 is described with reference to the flowchart in FIG. 7.

In step S1, the magnetic-filed antenna 50 receives a radio signal. The voltage detecting circuit 52a, which includes a smoothing circuit, for example, converts the voltage of the radio signal (AC signal) received by the magnetic-field antenna 50 to a DC voltage and transmits a signal corresponding to the converted voltage to the CPU 72.

In step S2, the CPU 72 determines whether the voltage detected by the voltage detecting circuit 52a (communication voltage) is equal to or higher than a predetermined voltage based on the signal transmitted from the voltage detecting circuit 52a. If the CPU 72 determines that the detected voltage is equal to or higher than the predetermined voltage, the process proceeds to step S3. If the CPU 72 determines that the detected voltage is lower than the predetermined voltage, the process proceeds to step S4. The predetermined voltage is a voltage at the time when the magnetic-field antenna 50 receives a radio signal transmitted from an external apparatus when the communication distance between the mobile phone apparatus 1 (strictly, the magnetic-field antenna 50) and the external apparatus is equal to a predetermined distance d. The predetermined distance d is several cm to several tens of cm, for example.

The voltage detected by the voltage detecting circuit 52a becomes higher as the communication distance between the magnetic-field antenna 50 and the external apparatus becomes shorter, and becomes lower as the communication distance between the magnetic-field antenna 50 and the external apparatus becomes longer. Thus, the communication distance between the magnetic-field antenna 50 and the external apparatus can be measured by measuring the communication voltage of the radio signal received by the magnetic-field antenna 50.

Proceeding to step S3 means that the communication distance between the magnetic-field antenna 50 and the external apparatus is equal to or shorter than the predetermined distance d. Proceeding to step S4 means that the communication distance between the magnetic-field antenna 50 and the external apparatus is longer than the predetermined distance d.

In step S3, the CPU 72 applies a certain voltage to the FET switch 52c. Accordingly, the FET switch 52c is set to an ON state by the CPU 72, so that the adjusting capacitor 52b becomes effective. After the adjusting capacitor 52b has become effective, capacitance (C) increases, and thus the resonance frequency f0 can be changed to a value lower than the predetermined frequency fx by using expression (1).

$$f0 = 1/2\pi(LC)^{1/2} \qquad (1)$$

In step S4, the CPU 72 applies no voltage to the FET switch 52c. Accordingly, the FET switch 52c is set to an OFF state by the CPU 72, so that the adjusting capacitor 52b becomes ineffective. After the adjusting capacitor 52b has become ineffective, the capacitance (C) does not change and thus the resonance frequency f0 is maintained at the value that is set before factory shipment (the value higher than the predetermined frequency fx).

In this embodiment, a reactance value is appropriately changed to adjust the resonance frequency f0 based on the voltage of a radio signal received by the magnetic-field antenna 50, that is, based on the communication distance between the external apparatus and the magnetic-field antenna 50. Thus, adjustment of the resonance frequency f0 before factory shipment can be omitted and the manufacturing cost can be reduced.

Conventionally, the spec acceptable range of the resonance frequency f0 has been narrow. However, according to this embodiment, the resonance frequency f0 suitable for a communication status (the distance from an external apparatus) can be dynamically selected during actual use, and thus a wide range of resonance frequencies can be used with no awareness of the maximum communication distance and the region where communication is impossible.

In this embodiment, the resonance frequency f0 of the magnetic-field antenna 50 is set at factory shipment so that the resonance frequency f0 is changed from a frequency higher than the predetermined frequency fx to a lower frequency, but the present invention is not limited to this. For example, the resonance frequency f0 of the magnetic-field antenna 50 may be set to a frequency lower than the predetermined frequency fx at factory shipment. In this case, a certain voltage is applied to the FET switch 52c so that the FET switch 52c is brought into an ON state in advance.

In this configuration, if the voltage detected by the voltage detecting circuit 52a is lower than the predetermined voltage (if the communication distance between the magnetic-field antenna 50 and the external apparatus is longer than the predetermined distance d), the CPU 72 stops applying voltage to the FET switch 52c so as to turn OFF the FET switch 52c, thereby changing the resonance frequency f0 to a value higher than the predetermined frequency fx. On the other hand, if the voltage detected by the voltage detecting circuit 52a is equal to or higher than the predetermined voltage (if the communication distance between the magnetic-field antenna 50 and the external apparatus is equal to or shorter than the predetermined distance d), the CPU 72 continues applying voltage to the FET switch 52c so as to maintain the resonance frequency f0 at the value that is set before factory shipment (the value lower than the predetermined frequency fx).

Example 2

Figure 8:
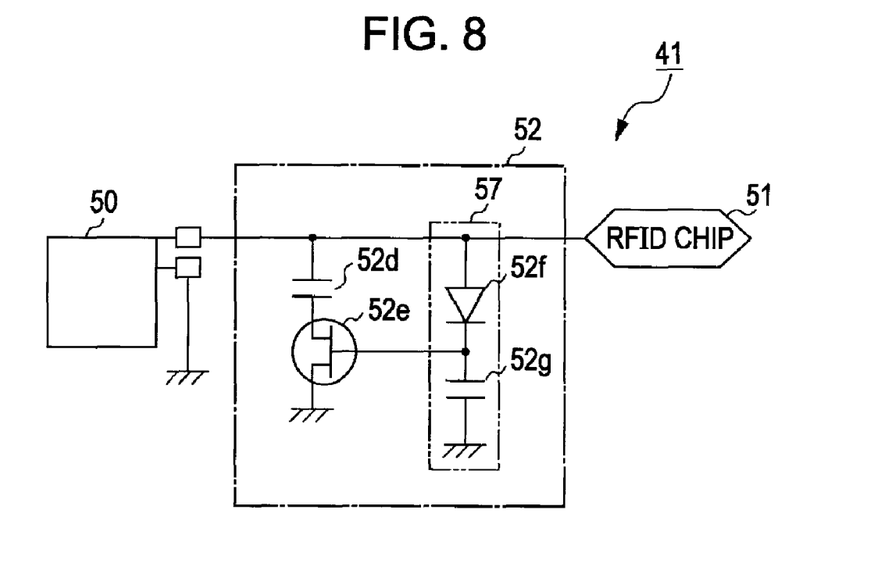
FIG. 8 illustrates a configuration of a signal processing unit according to example 2.

Referring to FIG. 8, the reactance variable unit 52 includes an adjusting capacitor 52d and a FET switch 52e connected to each other in series and a switch control unit 57 (frequency changing unit). The adjusting capacitor 52d and the FET switch 52e connected to each other in series and the switch control unit 57 connect to the magnetic-field antenna 50 in parallel. Assume that the resonance frequency f0 is set to a value higher than the predetermined frequency fx at factory shipment.

The switch control unit 57 includes a diode 52f and a smoothing capacitor 52g connected to each other in series. The output side of the diode 52f, that is, the input side of the smoothing capacitor 52g, connects to a gate terminal of the FET switch 52e.

When the communication voltage (AC voltage) based on a radio signal received by the magnetic-field antenna 50 has a value equal to or larger than a predetermined value, the switch control unit 57 converts the AC voltage to a DC voltage and applies the DC voltage to the FET switch 52e. Accordingly, the FET switch 52e is set to an ON state, the adjusting capacitor 52d becomes effective, the capacitance (C) increases, and the resonance frequency f0 is changed to a value lower than the predetermined frequency fx in accordance with expression (1).

When the communication voltage (AC voltage) based on a radio signal received by the magnetic-field antenna 50 has a value smaller than the predetermined value, the switch control unit 57 does not convert the AC voltage to a DC voltage and applies no voltage to the FET switch 52e. Accordingly, the FET switch 52e is maintained at an OFF state. The resonance frequency f0 is maintained at a value higher than the predetermined frequency fx.

Whether a voltage is applied to the FET switch 52e depends on the voltage-current characteristic of the diode 52f.

A DC voltage is generated by the switch control unit 57 in accordance with the level of the communication voltage that is generated by magnetic-field communication between the magnetic-field antenna 50 and the external apparatus, and the DC voltage is applied to the FET switch 52e. Since the CPU 72 does not relate to the switching operation of the FET switch 52e, the resonance frequency f0 that is suitable for an actual communication status can be obtained while saving power.

Example 3

Figure 9:
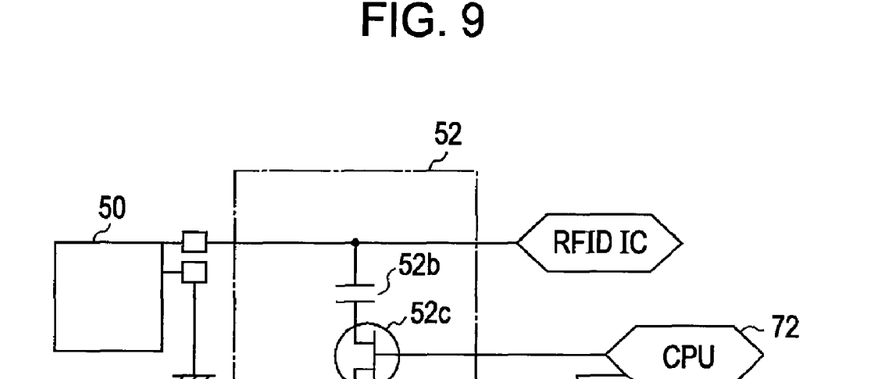
FIG. 9 illustrates a configuration of a signal processing unit according to example 3.

Referring to FIG. 9, a magnetic sensor 100 is capable of detecting the intensity and direction of a surrounding magnetic field by detecting an output voltage that changes in accordance with change in magnetic flux density. Any type of magnetic sensor can be used, including a sensor including a Hall element in which an electromotive force is generated due to an interaction of a magnetic field and a current, called a Hall effect; and a sensor including a Wheatstone bridge having various magnetic resistance elements having an electric resistance value that changes in accordance with the intensity of a magnetic field, just to name a couple. However, the magnetic sensor 100 according to this embodiment is not limited to such sensors, and any sensors may be used. Although not illustrated in FIG. 9, the magnetic sensor 100 is supplied with power from a power supply and detects the intensity and direction of the surrounding magnetic field by using the power.

The magnetic sensor 100 connects to the CPU 72 and transmits a signal corresponding to the intensity of a detected magnetic field to the CPU 72.

The FET switch 52c and the adjusting capacitor 52b connect to the magnetic-field antenna 50 in parallel.

The CPU 72 determines whether the intensity of the magnetic field detected by the magnetic sensor 100 is equal to or larger than a predetermined value based on the signal transmitted from the magnetic sensor 100. Here, the intensity of the magnetic field at the predetermined value means the intensity of the magnetic field detected by the magnetic sensor 100 when the communication distance between the mobile phone apparatus 1 (strictly, the magnetic-field antenna 50) and the external apparatus is equal to the predetermined distance d. The predetermined distance d is several cm to several tens of cm, for example.

If the CPU 72 determines that the intensity of the detected magnetic field is equal to or larger than the predetermined value (the communication distance between the magnetic-field antenna 50 and the external apparatus is equal to or shorter than the predetermined distance d) based on the signal transmitted from the magnetic sensor 100, the CPU 72 applies a certain voltage to the FET switch 52c. Accordingly, the FET switch 52c is set to an ON state by the CPU 72 and the adjusting capacitor 52b becomes effective. That is, the resonance frequency f0 of the magnetic-field antenna 50 is changed to a value lower than the predetermined frequency fx.

If the CPU 72 determines that the intensity of the detected magnetic field is smaller than the predetermined value (the communication distance between the magnetic-field antenna 50 and the external apparatus is longer than the predetermined distance d) based on the signal transmitted from the magnetic sensor 100, the CPU 72 applies no voltage to the FET switch 52c. Accordingly, the FET switch 52c is set to an OFF state by the CPU 72 and the adjusting capacitor 52b becomes ineffective. That is, the resonance frequency f0 of the magnetic-field antenna 50 is changed to a value higher than the predetermined frequency fx.

In this way, according to example 3, the resonance frequency f0 is adjusted based on the intensity of the magnetic field detected by the magnetic sensor 100.

Example 4

Figure 10:
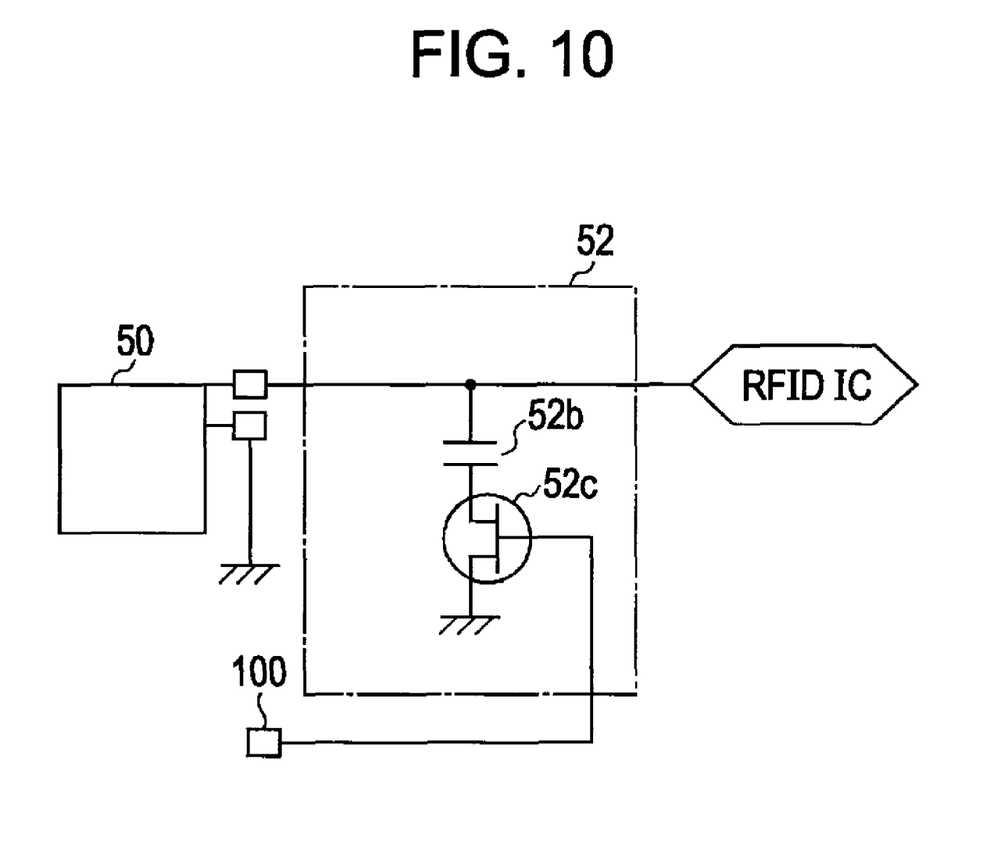
FIG. 10 illustrates a configuration of a signal processing unit according to example 4.

Referring to FIG. 10, the configuration of the magnetic sensor 100 is basically the same as that in example 3. Note that, unlike in example 3, the magnetic sensor 100 does not connect to the CPU 72. The magnetic sensor 100 is adjusted so that a certain voltage is applied to the FET switch 52c based on power supplied from the above-described power supply (not illustrated) if the intensity of the detected magnetic field is equal to or larger than the predetermined value. The adjustment can be realized by adjusting the GND status around the magnetic sensor 100, for example. The intensity of the magnetic field at the predetermined value is the same as that in example 3, that is, the intensity of the magnetic field detected by the magnetic sensor 100 when the communication distance between the mobile phone apparatus 1 (strictly, the magnetic-field antenna 50) and the external apparatus is equal to the predetermined distance d. The predetermined distance d is several cm to several tens of cm, for example.

The FET switch 52c and the adjusting capacitor 52b connect to the magnetic-field antenna 50 in parallel.

In example 4, if the intensity of the magnetic filed detected by the magnetic sensor 100 is equal to or larger than the predetermined value (if the communication distance between the magnetic-field antenna 50 and the external apparatus is equal to or shorter than the predetermined distance d), a certain voltage is applied to the FET switch 52c. Accordingly, the FET switch 52c is set to an ON state, so that the adjusting capacitor 52b becomes effective. That is, the resonance frequency f0 of the magnetic-field antenna 50 is changed to a value lower than the predetermined frequency fx.

If the intensity of the magnetic field detected by the magnetic sensor 100 is smaller than the predetermined value (if the communication distance between the magnetic-field antenna 50 and the external apparatus is longer than the predetermined distance d), no voltage is applied to the FET switch 52c. Accordingly, the FET switch 52c is set to an OFF state and the adjusting capacitor 52b becomes ineffective. That is, the resonance frequency f0 of the magnetic-field antenna 50 is changed to a value higher than the predetermined frequency fx.

Since the CPU 72 does not relate to the switching operation of the FET switch 52c, the resonance frequency f0 suitable for an actual communication status can be obtained while saving power. Also, adjustment of the resonance frequency f0 before factory shipment can be omitted and the manufacturing cost can be reduced.

A FET switch is used as the switch in examples 1 to 4. However, the present invention is not limited to this, and any switch may be used as long as one end of the adjusting capacitor can be short-circuited to the GND in an ON state. For example, a transistor or a mechanical SW may be used.

In the mobile phone apparatus 1 according to this embodiment, the communication distance from an external apparatus is measured based on the level of the communication voltage of a radio signal received by the magnetic-field antenna 50. However, the present invention is not limited to this. For example, the mobile phone apparatus may include a distance measuring device or the like using infrared rays, and the communication distance from an external apparatus may be measured by using the distance measuring device. The magnetic sensor 100 may function also as an open/close detecting sensor to detect an open state or a folded state of the operation-side casing 2 and the display-side casing 3 and as a geomagnetic sensor. With this configuration, the necessity of separately providing the open/close detecting sensor and the geomagnetic sensor can be eliminated, so that the number of components can be preferably reduced.

The invention claimed is:
1. A communication apparatus comprising:
a communication unit to perform magnetic-field communication with an external apparatus in a first resonance frequency that is higher than a predetermined resonance frequency;
a communication status monitoring unit to monitor a communication status of the communication unit with the external apparatus; and
a frequency changing unit to change the first resonance frequency in accordance with the communication status monitored by the communication status monitoring unit;
wherein the communication status monitoring unit measures a distance between the external apparatus and the communication unit;
wherein the frequency changing unit changes the first resonance frequency in accordance with the distance between the external apparatus and the communication unit measured by the communication status monitoring unit; and
wherein, if a distance between the external apparatus and the communication unit measured by the communication status monitoring unit is equal to or shorter than a predetermined distance, the frequency changing unit changes the first resonance frequency to a second frequency that is lower than the predetermined resonance frequency.
2. The communication apparatus according to claim 1, wherein the communication status monitoring unit measures a level of a communication voltage generated by magnetic-field communication between the communication unit and the external apparatus.
3. The communication apparatus according to claim 2, wherein the frequency changing unit changes the first resonance frequency in accordance with the level of the communication voltage measured by the communication status monitoring unit.
4. The communication apparatus according to claim 1,
wherein the communication status monitoring unit measures a communication voltage generated by magnetic-field communication between the communication unit and the external apparatus, and
wherein the frequency changing unit changes the first resonance frequency in accordance with the communication voltage measured by the communication status monitoring unit.
5. The communication apparatus according to claim 4, wherein, if the communication voltage measured by the communication status monitoring unit is equal to or higher than a first voltage, the frequency changing unit changes the first resonance frequency by lowering the predetermined resonance frequency.

6. The method according to claim 1, wherein a value of the predetermined resonance frequency is substantially in the middle of a resonance frequency range.

7. A computer implemented method for controlling a communication apparatus, comprising;
- receiving a magnetic-field communication from an external apparatus at a first resonance frequency that is higher than a predetermined resonance frequency;
- determining a communication distance between the communication apparatus and the external apparatus; and
- modifying the first resonance frequency of the communication apparatus in accordance with the communication distance between the communication apparatus and the external apparatus wherein if the communication distance between the communication apparatus and the external apparatus is equal to or shorter than a predetermined distance, the first resonance frequency is modified to a second resonance frequency that is lower than the predetermined resonance frequency.

8. The method according to claim 7, wherein determining a communication distance comprises comparing a communication voltage value generated by the magnetic-field communication with the external apparatus to a predetermined value.

9. The method according to claim 7, wherein determining a communication distance comprises interrogating the external apparatus with an infrared signal.

10. The method according to claim 7, wherein determining a communication distance comprises use of a distance measuring device.

11. The method according to claim 7, further comprising performing the determining and modifying steps during ongoing communication with the external apparatus to dynamically optimize magnetic-field communication.

12. The method according to claim 7, wherein a value of the predetermined resonance frequency is substantially in the middle of a resonance frequency range.

* * * * *